United States Patent
Howell

(12) 
(10) Patent No.: US 6,885,767 B1
(45) Date of Patent: Apr. 26, 2005

(54) SILHOUETTING APPARATUS AND METHOD

(76) Inventor: Paul Howell, 477 Congress St., Portland, ME (US) 04101

(*) Notice: Subject to any disclaimer, the term of this patent is extended or adjusted under 35 U.S.C. 154(b) by 714 days.

(21) Appl. No.: 09/853,280

(22) Filed: May 11, 2001

(51) Int. Cl.$^7$ .................................................. G06K 9/34
(52) U.S. Cl. .......................................... 382/173; 396/3
(58) Field of Search ................................. 382/173, 284, 382/162, 163, 164; 348/584–587, 598, 722; 396/1–5, 429, 544; 352/89, 47, 48, 88; 353/28, 30, 33–34; 345/639

(56) References Cited

U.S. PATENT DOCUMENTS

| | | | |
|---|---|---|---|
| 4,707,091 A | * 11/1987 | Anthony | 352/47 |
| 4,796,990 A | * 1/1989 | Crothers et al. | 352/89 |
| 4,958,217 A | * 9/1990 | Kimura et al. | 358/538 |
| 5,345,313 A | 9/1994 | Blank | 348/598 |
| 5,574,511 A | * 11/1996 | Yang et al. | 348/586 |
| 5,577,179 A | 11/1996 | Blank | 345/639 |
| 5,831,685 A | 11/1998 | Vlahos et al. | 348/587 |
| 5,923,380 A | * 7/1999 | Yang et al. | 348/586 |
| 5,946,500 A | 8/1999 | Oles | 396/3 |
| 5,971,544 A | 10/1999 | Perry | 353/28 |
| 6,134,346 A | 10/2000 | Berman et al. | 382/163 |

FOREIGN PATENT DOCUMENTS

| | | | | |
|---|---|---|---|---|
| GB | 2162628 A | * | 5/1984 | F21M/1/00 |

* cited by examiner

*Primary Examiner*—Leo Boudreau
*Assistant Examiner*—Ishrat Sherali
(74) *Attorney, Agent, or Firm*—Patricia M. Mathers; Thomas L. Bohan

(57) ABSTRACT

Apparatus and method for producing an image containing only an object of interest, without any background. They are directed at making the background appear so much brighter than the object that the brightness differential can be used to discriminate between the two and then to strip the background from the image.

16 Claims, 6 Drawing Sheets

SILHOUETTING APPARATUS AND METHOD

BACKGROUND INFORMATION

1. Field of the invention

The invention relates to the field of photography. More particularly, the invention relates to the field of still photography. More particularly yet, the invention relates to the removal of the background from a photograph consisting of an object of interest set against a background so as to produce an image of the object by itself.

2. Description of the Prior Art

In the field of commercial photography, the isolating of an object of interest from the background photographed with that object is referred to as "silhouetting" the image. Such silhouetted images are often desired in commercial photography used for advertising and catalog purposes. Examples of silhouetted images can be seen in most catalogs of merchandise, where the products offered are shown as simply placed on the catalog page, without any background at all (apart from the color of the page). In order to present a clean and natural image, it is, of course, critical that the original background not contaminate the image and that it be stripped very precisely and cleanly from the image.

Regardless of the level of resolution with which the image is photographed, it is desirable to be able to cut away the background and show just the object of interest, for later transfer to catalog pages and the like. For high-resolution digital color photography of still objects, the image is generally created by three separate shots though in the case of the technology patented by the present inventor two shots may be sufficient.

One way to strip off the background from a digitized image is by "brute force," namely the manual removal of the background using techniques such as are available in off-the-shelf programs such as Photoshop®. This, however, can be extremely tedious, especially near the interface between the background and the object of interest. Thus, techniques have been developed over the years so as to automate the process.

The most common automated method for background stripping has involved "chroma replacement," In preparation for using this method to generate a silhouetted image, the object of interest is photographed in front of a background that is all the same color, ideally a color different from those of the object of interest. Most commonly, the color has been blue, and occasionally green, background. After the photography is completed, standard computer techniques are used to eliminate from the composite photograph all portions (pixels) that have the background color. More particularly, the stripping program is directed to remove from the photograph all pixels having a color that lies within a preprogrammed bandwidth centered on the background color. This chroma replacement has, inherently, several disadvantages, especially when used with high quality, high resolution studio photography of still objects. An obvious disadvantage is that it will remove from the object of interest all portions that have a color falling within that defined bandwidth. This means that a subsequent processing must be used wherein those parts are added back into the photograph. Another problem arises because the color of the background—which, by its nature, is in close proximity to the object—is reflected onto the object, thereby creating a transition area that makes it difficult to accurately distinguish between background and object during the stripping process. This can result in border portions of the object being stripped away. If the surface of the object with the reflected color is sufficiently different from the color of the pure background, that region will not get stripped away, but can end up looking strangely colored once the background is gone.

Many attempts have been made to improve the chroma replacement process so as to eliminate the above-mentioned drawbacks and to create clean silhouetted images with a minimum of processing effort. Such an attempt in connection with single-shot photography of moving objects is disclosed in U.S. Pat. No. 5,948,500 (Oles; issued 1999), which also explains why the chroma replacement technique has not been widely used in the commercial photography industry in connection with high quality studio shots. Nevertheless, the solution of Oles stays within the context of the chroma-replacement technique, and thus did not address the problems inherent in that technique. Furthermore, Oles is not directed at high resolution still photography. U.S. Pat. No. 8,134,348 (Berman et al.; issued 2000) addresses the particular problem in chroma replacement presented by objects that have semi-transparent edges (such as a person with waving hair). The method of Berman et al. creates a number of frames of the background, with and without an image of the object, determines a transition area in which some transparency exists at the boundary of the object and the background, and strips the background from around the photographed object. Oles and Berman et al. both have the drawbacks mentioned above, in that the colors on the person or object being photographed must be coordinated so as not to coincide with the bandwidth of the background color.

Color contamination from the background itself creates problems. Most frequently, a saturated color is used as the background because it is easier to strip the background from the image later if it can be defined within a narrow bandwidth of color. Such colors, however, can spill onto the object and color-contaminate an image to an extent that is unacceptable for commercial photography. On the other hand, a white or light-colored background makes the bottom of an image look lighter and creates a perceptibly strange impression once the background is gone. Backgrounds of medium gray may reduce color contamination, but computerized processes cannot clearly differentiate between the background gray and the outline of the image.

Today, in commercial photography establishments using digital photography techniques, a person manually traces around the silhouette of the image on a computer screen in order to provide the computer with an outline from which to remove the background. This is an extremely tedious and time-consuming task.

What is therefore needed is an apparatus and a method of removing the background from a digitally photographed image, cleanly and precisely, with fewer processing operations than are now required. What is further needed is such an apparatus and a method that functions independently of color. What is yet further needed, in view of the expense of high-quality photography equipment, is such an apparatus that is adaptable to existing camera equipment and lenses.

SUMMARY OF THE INVENTION

For the above-cited reasons, it is an object of the present invention to provide apparatus and a method for stripping the background from a digitally photographed image that is independent of the color of the background, that is, of producing a final image that consists only of the object of interest. It is a further object to provide apparatus that is mountable on existing camera equipment and adaptable to the particular lens being used. It is a yet further object to provide such a method that involves fewer processing operations.

The objects are achieved by departing completely from the chroma replacement approach and introducing an "intensity replacement" technique. In other words, in the approach of the present invention, the composite photograph will consist of the object of interest in combination with a very bright background. The stripping process then involves removing all portions of the composite photo that display an intensity above a certain pre-defined threshold. Although this is the basic invention, there are many ways of implementing it, some simple with a limited flexibility and others providing the user with a great deal of scope in determining the degree to which the background pixels are to be stripped, and thus a great deal of scope in dealing with such problems as semi-transparent objects.

The general method of implementing the present invention will be set out below. The goal, of course, is to be able to achieve maximum contrast between the object and the background, and the refinements in the basic invention are introduced as a means of reaching that goal. When using the invention, one first takes one or several shots of the object-plus-background with a light level and illumination pattern that is usually used for that purpose. During that series of shots the background that is used is one that presents a very high degree of reflection. In most of the embodiments of the invention, the background is chosen to provide retro-reflection. A retro-reflecting surface is one that reflects incident light back in the direction from which it came, regardless of the direction. Such surfaces are used on many highway signs and, more recently, on reflective tape placed on semi-trailer trucks. Note that retro-reflection is very different from both specular reflection (where the angle of reflection with the respect to the reflecting surface is equal to the angle of incidence of the light on that surface) and diffuse reflection, where regardless of the angle of incidence, the light is reflected through a range of angles. In addition to being as retro-reflective as possible, the background must have a very high albedo, that is, must reflect a very high proportion of the incident light.

Then, with the background surface as described above, and without moving the object, one takes the "mask shot," which is of the same scene but at a very high level of illumination. Moreover, the illumination must "appear" to come from the direction of the camera lens, so that the light reflected goes straight into the lens, further enhancing the contrast in luminosity between the background and the object, as viewed by the camera.

There are a number of ways of establishing the conditions set out above for the mask shot. One is to set up an arrangement whereby a strobe light is triggered with the shutter release on the camera, and the optics arranged so that the light from the strobe is directed to the object/background as if it were emanating from the plane of the lens of the camera. The apparatus that achieves this will be denoted in this discussion as the "silhouetting apparatus." In many embodiments of the invention, the silhouetting apparatus is set up and affixed to the camera lens so that the principal axis of the lens is horizontal and at 90° with respect to the axis of the strong light source used for the masking shot. In the center of this silhouetting apparatus is located a partially silvered mirror, a light source, and a small condenser lens. The apparatus is used together with a camera and retro-reflective background sheeting to create a mask, that is, the mask exposure is separate, or decoupled, from the image exposures. When the camera shutter opens, the light source in the silhouetting apparatus causes intense light to impinge on the object to be photographed and the retro-reflective sheeting. Because of the high reflectivity of the sheeting, the background will almost always be brighter than the object of interest. The sharp contrast that is thereby created between image and background produces a mask that provides a clean, precise outline of the image relative to the background, based on luminance. Stated in other words, the method decouples the mask exposure from the one or more color exposures of the composite scene.

A particular advantage of the apparatus and method of the present invention is that it is based on a background that is neutral, that is, that adds no color to the image. This offers definite advantage when photographing transparent or semi transparent images, such as, for example, a glass of water, because the background can be precisely defined by the difference in luminance between the glass, the water, and the background. In contrast, with the conventional method of eliminating background based on color, a photograph of a glass of water taken in front of a conventional blue sweep will result in an image of a blue glass. Assuming that the background color discrimination is successful, the background will be eliminated, but the glass and the water will remain blue, unless, as noted earlier, the blue is close enough to the color of the pixels being stripped, in which case parts of the semi-transparent object of interest will also be stripped away.

The light source can be a strobe light or a constant light. It can also be a colored light selected with a narrow-band filter that will pass the light of that particular color and no other. It is to be noted, however, that it is still the intensity that is used as a discriminator for purposes of producing the mask.

In the present invention, the strong light source can be attached directly to the silhouetting apparatus or, the source can be placed at some distance from the box, on the floor, for example, with the light conveyed from the source to the point where it is needed through use of an optical fiber. This may be desirable when it is important to have the apparatus to which the camera is attached light and portable. For example, the same light source may be used without repositioning to service several different silhouetting setups.

In refining the basic technique, an aperture may be used to constrict the beam of intense light to a beam diameter that is equal to or smaller than the diameter of the aperture (iris) of the camera lens. This is done to eliminate the iris shadow phenomenon that can occur when the diameter of the projected light is greater than that of the iris and that manifests itself as a penumbra surrounding the object of interest, so that there is not a maximally sharp contrast in intensity at the border of the object and the background in the mask shot. This is referred to as a "feathering" of the edge of the object and is definitely undesirable in the application that is the subject matter of the present invention. In other words, restricting the diameter of the intense light beam used in producing the mask shot to a diameter that is coincident with or smaller than that of the camera iris improves the edge contrast around the image.

Another refinement in the highest embodiments of the present invention has to do with "trapping" light that is not to be used in the production of the mask shot Highest quality is achieved by ensuring that essentially all of the light that enters the camera lens during the production of the mask shot originated from the light deliberately directed toward the object plus background. That light in turn is the portion of the beam that has been manipulated so that it is coming directly from the direction of the plane of the camera lens. With most approaches to so manipulating the incident beam of high-intensity light, a considerable fraction of the total beam is diverted from striking the object and background. Similarly, when the high-intensity light returns from the scene more of it is diverted. It is important that that diverted light not somehow, by series of reflections, end up entering the camera lens. (Such light in this context can be referred to as parasitic light.) Such parasitic light is eliminated by arranging to trap it. This can be done by letting it impinge on surfaces or openings with an extremely low albedo (reflectance), surfaces or opening that approximate "black bodies."

The most common way of producing the geometry that the present invention requires is to use the classic beam-splitting technique. In this technique, as applied in the present context, a partially slivered glass plate is deployed between the camera lens and the scene to be photographed. This plate is arranged so that the plane of the plate makes a 45° angle with the plane of the camera lens. More particularly, if the intense light beam used for the mask shot is to be directed vertically upon the plate and the principal axis of the lens is horizontal, the plate is deployed so that its upper edge is farther from the lens than its lower edge. This plate intercepts light that normally is directed toward the lens, allowing a portion to pass through to the lens, but reflecting the rest downward. The fraction depends on the degree of silvering. More importantly for the operation of the present invention, the beam of intense light that is turned on for the mask shot is also spilt by the beam splinter. Part of it will continue straight up (assuming for definitiveness the geometry described above) and part of it will be reflected from the partially silvered plate in a direction at right angles to the vertical. For definitiveness, take that direction to be to the right of the direction of the original beam. By this means, a virtual light source has been created that satisfies the need of the technique. Even though the real high-beam light source is below the rest of the apparatus and directed straight upward, the light of this beam that is directed on the scene comes, for all physical purposes, from a point partway between the camera lens and the scene. Furthermore, that virtual light source is directed horizontally toward the scene traveling in a direction parallel to the camera's principal axis.

For the method to work, it is important that the virtual image be correctly positioned and oriented. This is a function in large part of the three-dimensional position and orientation of the partially silvered plate. In Cartesian coordinates, the three dimensions are along the X, Y, and Z axes. The Z axis (direction) is here defined as the vertical direction, the X axis is along the principal axis of the lens, and the Y axis is in the horizontal plane and transverse to the principal axis.

Shadows created from a misalignment of the virtual light source image can be a source of significant shadow formation during the mask shot, shadow formation that reduces the sharpness of the background/object contrast. Thus it is important to provide a means of adjusting the silhouetting apparatus in the X and Y directions so as to be able to align the center of the virtual light source with the center of the camera lens, that is, to align the center of the virtual light source with the principal axis of the camera. Having the virtual source off to one side will give rise to a shadow on the background on one or more sides of the object. It is also important to be able to make an adjustment in the Z direction (that is, of the vertical distance between the real light source and the beam-splitting plate) so that the distance of the light-beam aperture from the plate is equal to the distance of the camera iris from the plate. Failure to make this adjustment can give rise to parallax errors in the mask shot. The adjustment in the Z-direction is specific to a given lens, as each type of lens can have a different iris placement it is very important to make this adjustment before the image is produced, as parallax errors can be very difficult to edit out of an image afterwards.

It has been stated that the background needs to present a retro-reflective surface for the intense beam of light that is directed onto it for the making of the mask shot. By retro-reflective is meant that each ray of light is reflected back in the direction from which it came as it struck the reflecting surface. Because, to the surface, the light appears to come from the camera lens, it is toward the camera lens that the retro-reflective surface sends the reflected beam. Note that the fraction of this reflected light that actually reaches the camera lens is determined, in the embodiments involving a beam splitter, by the degree of silvering of the beam-splitter plate. The greater the silvering, the greater the fraction of the reflected light that is sent back down to the actual light source, and conversely. Looking at it from the other end, the greater the silvering, the greater the fraction of the beam directed from the actual source to the plate that goes to make up the virtual source. The remainder of that light continues straight up. It is this light that goes straight up that needs to be prevented from subsequently entering the lens by means of some circuitous route involving multiple reflections.

All things being equal, the goal is to maximize the fraction of the light incident on the background that is reflected by the retro-reflective surface that makes up the background. The earliest widespread use of retro-reflective surfaces probably dealt with road signs. Until very recently, the retro-reflectivity of those signs was based on building into them a myriad of little "corners" or cubes. These cubes are grouped in a grid pattern on a reflective sheet, that, unfortunately, is perceptible as a mosaic pattern in a photograph and, for that reason, that type of retro-reflective surface is not suitable for high-resolution commercial photography, although it does provide an extremely high degree of reflectivity. The type of retro-reflective surface that is used in the Preferred Embodiment of the present invention is a sheet containing glass spheres evenly distributed across its surface. As indicated above, the background sheet in this context is referred to as the sweep. In the Preferred Embodiment, the sweep is a sheet uniformly covered with contiguous glass spheres. For the most part, the sweep is deployed so as to form a vertical plane behind the object of interest, a vertical plane that is substantially perpendicular to the principal axis of the camera.

A limitation to the sweep composed of glass spheres is that, unlike the other type of sweep just described, it is not completely retro-reflective. Defining the axis of each of the glass beads as being perpendicular to the plane of the sweep, it can be stated that retro-reflectivity only for rays of light impinging the sphere within a cone centered on the glass bead and having a central angle of 60°. Equivalently stated, this limitation requires that the angle that the incident ray makes with the plane of the sweep be at least 30°. This can be a serious problem if the sweep is placed, as it traditionally is, beneath the object as well as behind it. In such a case, the light used in preparing the mask will strike that part of the sweep lying under the object at something of a grazing angle and hence will not be retro-reflected. The result is that in the mask shot that part of the background will appear at a much lower intensity, which makes it difficult to digitally strip the background from the image and maintain acceptable quality standards for commercial photography. In the Preferred Embodiment of the invention, the approach used to address this problem includes the use of a transparent support surface for the object, with the sweep simply continuing down vertically below the object rather than between the object and the support surface. Ideally, the sweep sweeps in under the support table slightly. The light from the silhouetting apparatus will impinge on the sweep above and below and at the level of the object with an angle greater than 30°, thus ensuring retro-reflection and an overall high contrast in the silhouetting mask between the image and the background.

When creating the silhouetting mask, the contrast can be aggressively adjusted on the computer image by adjusting the thresholds for pure black and pure white. The computer and programs used for controlling and adjusting the contrast settings are well-known in the field of digital photography and are not included within the scope of the invention and are not described in any detail herein. This adjustment can be used to deal with situations where the border of the object is semi-transparent In general, given the need to make a choice, it is better to strip a few pixels off the object than to leave some pixels of the background.

DETAILED DESCRIPTION OF THE PREFERRED EMBODIMENT

Figure 1:
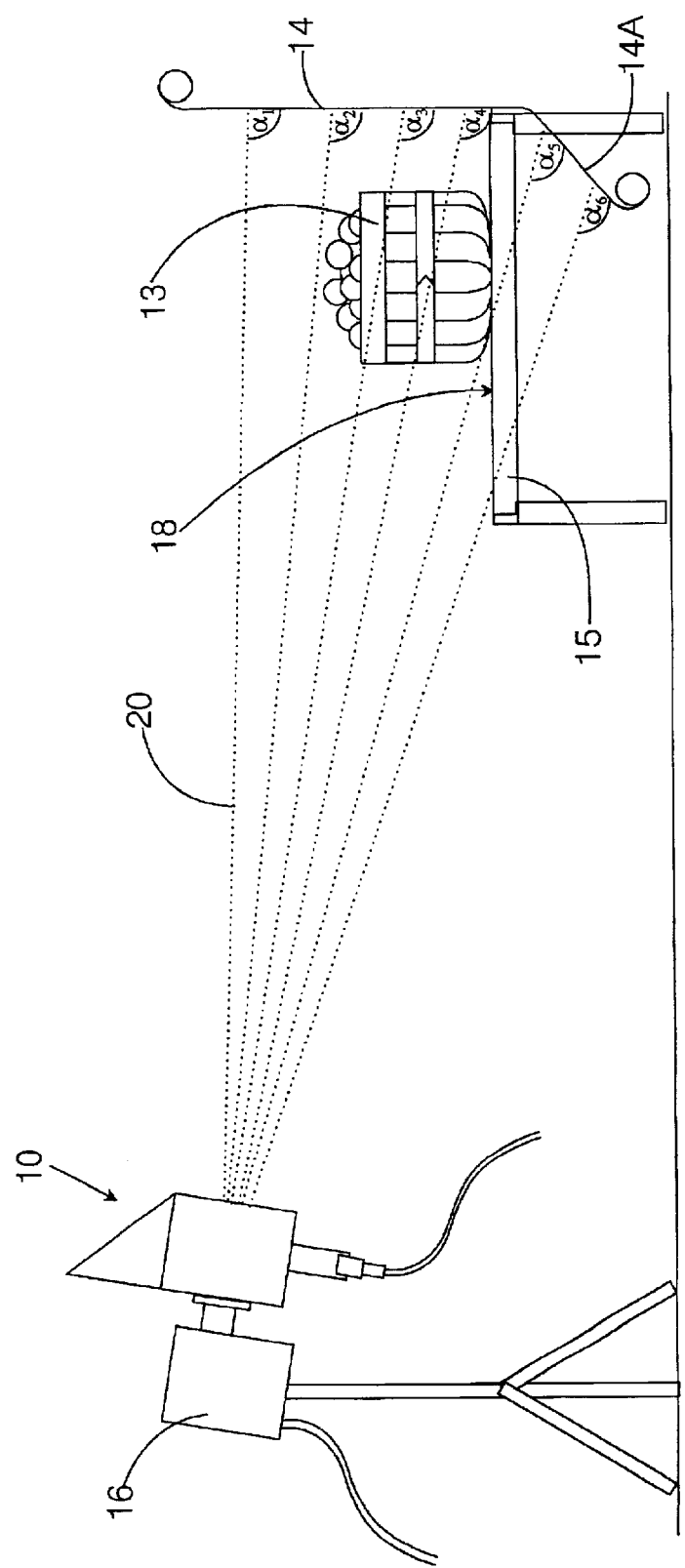
FIG. 1 is a diagrammatic illustration of the apparatus and method according to the Preferred Embodiment of the invention, showing the silhouetting apparatus mounted on a camera and light from the silhouetting apparatus illuminating the sweep behind and under the object.

FIG. 1 is a diagrammatic illustration of the Preferred Embodiment of the apparatus and method according to the invention. A silhouetting device 10 is mounted on a conventional digital camera 16. Placed on a transparent support table 15 is an object 13 to be photographed and ultimately to appear in a photograph that contains only an image of the object 13. Arranged behind the object 13 is a sweep 14 of retro-reflective sheeting consisting of a coating of small glass spheres.

Figure 2:
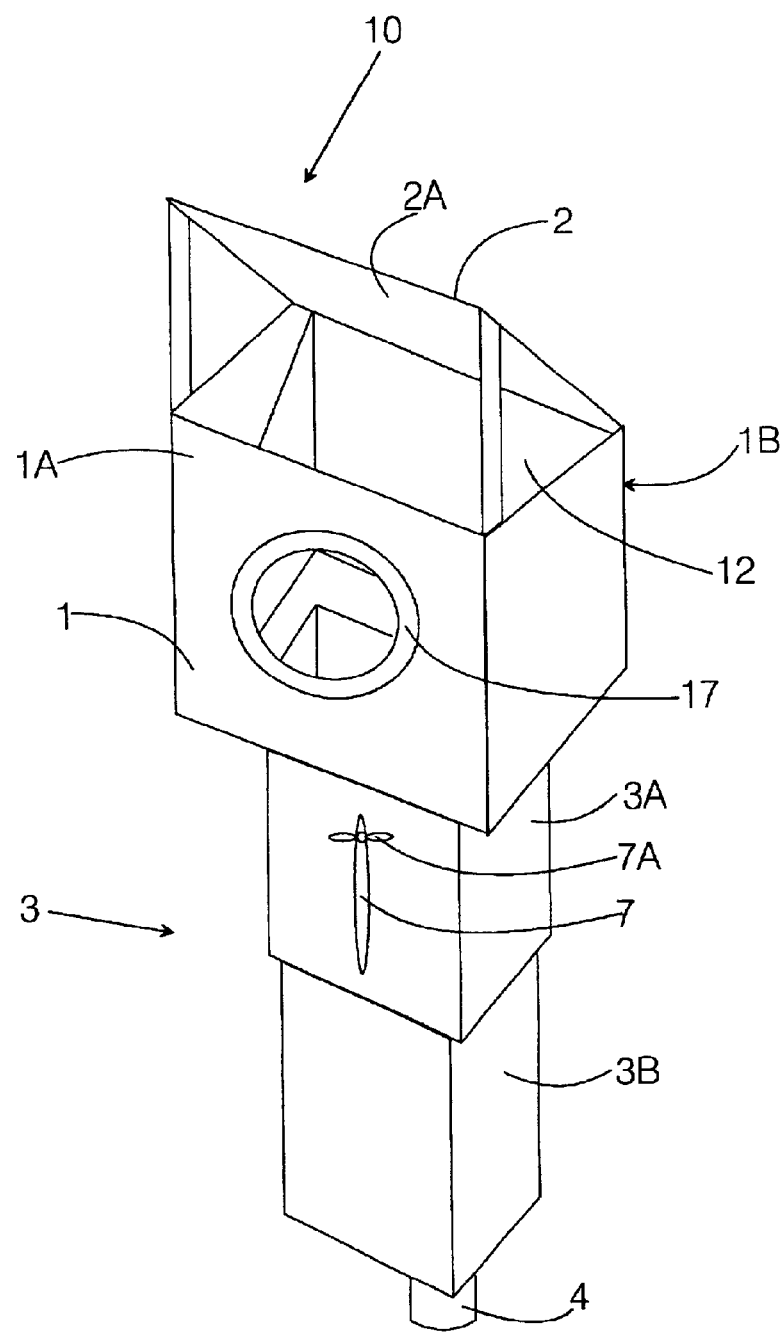
FIG. 2 is a perspective view of the Preferred Embodiment of the silhouetting apparatus according to the invention.
Figure 2A:
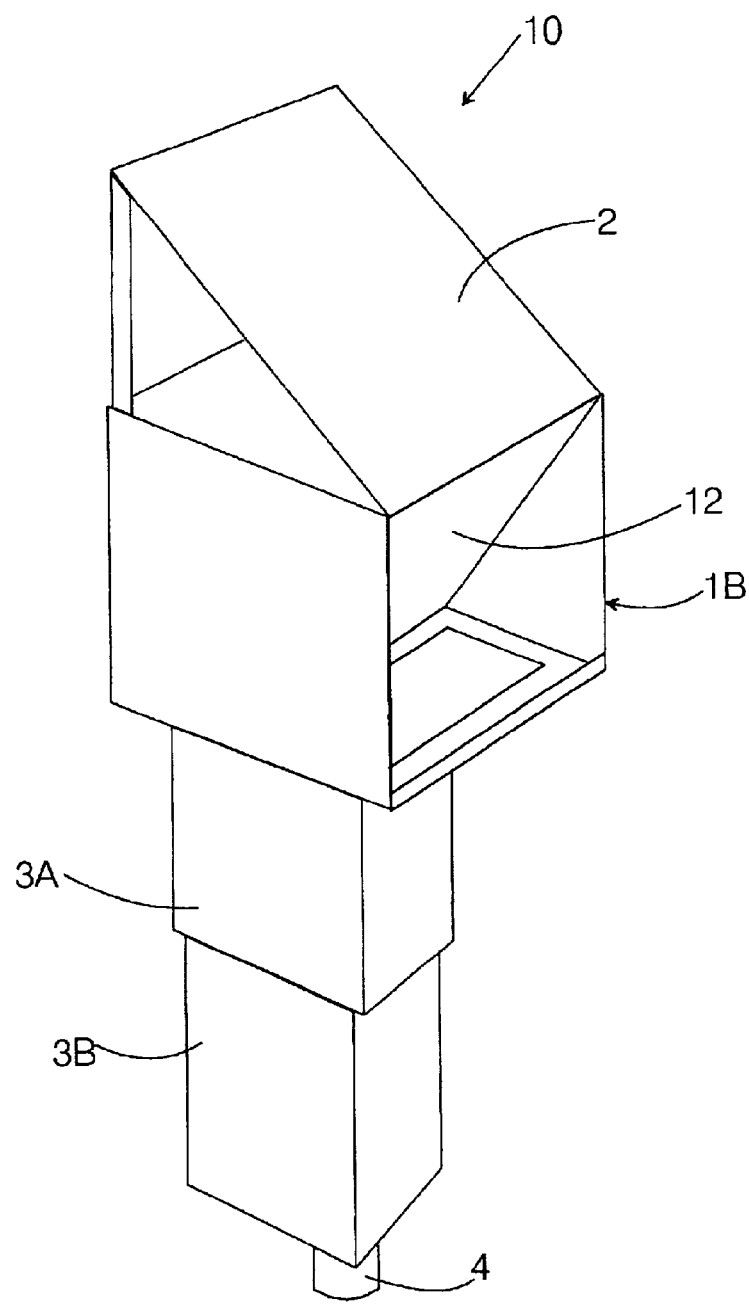
FIG. 2A is similar to FIG. 2, but with the silhouetting apparatus rotated about its vertical axis by about 94°.

FIG. 2 and FIG. 2A each shows a perspective view of the silhouetting device 10. The silhouetting device 10 is seen therein to include a reflection box 1, an adjustable mount 3, and a light trap 2. The reflection box 1 has an open front face 1B and a mostly closed rear face 1A. The light trap 2 is basically a minimally reflective, planar black surface mounted on top of the reflection box 1 so that the plane of the light trap 2 makes an angle of 45° angle relative to the vertical direction and hence relative to the upper edge of the box 1. A planar partially silvered glass plate 12 extends across the inside of the reflection box 1 from the upper edge of the front face 1B to the lower edge of the rear face 1A of the box 1 making an angle of −45° with the upper edge of the box 1, such that a 90° angle is formed between the plate 12 and the light trap 2. In the Preferred Embodiment the minimally reflective inner surface of the light trap 2 is provided by a black velvety fabric, that is, a fabric with a nap. The silhouetting device 10 is releasably affixed to the camera 16 by means of a mounting ring 17 shown in FIG. 2. The mounting ring 17 is designed to accept most conventional camera lenses.

Figure 3:
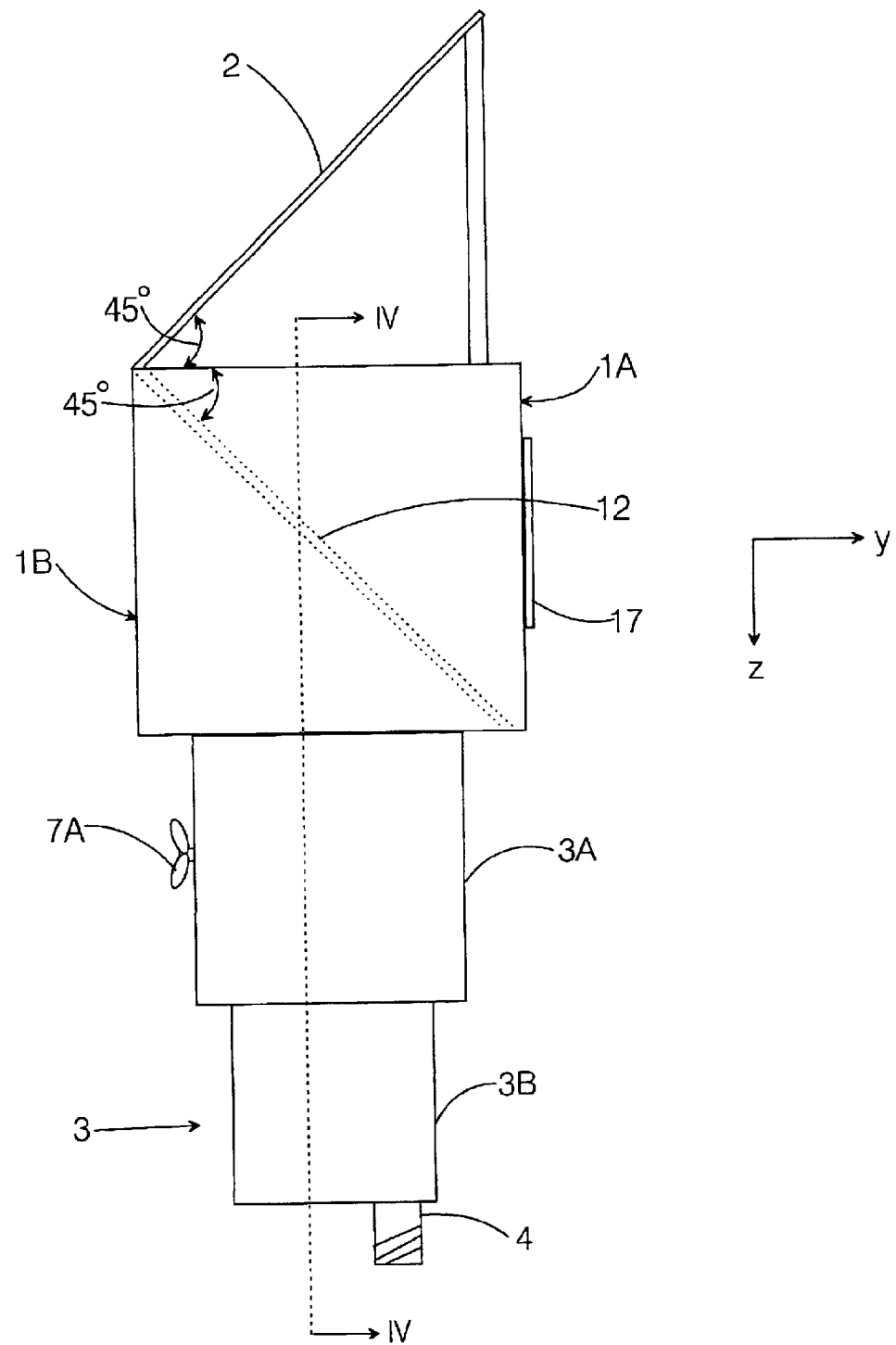
FIG. 3 is a side view of the silhouetting apparatus according to the Preferred Embodiment of the present invention.
Figure 4:
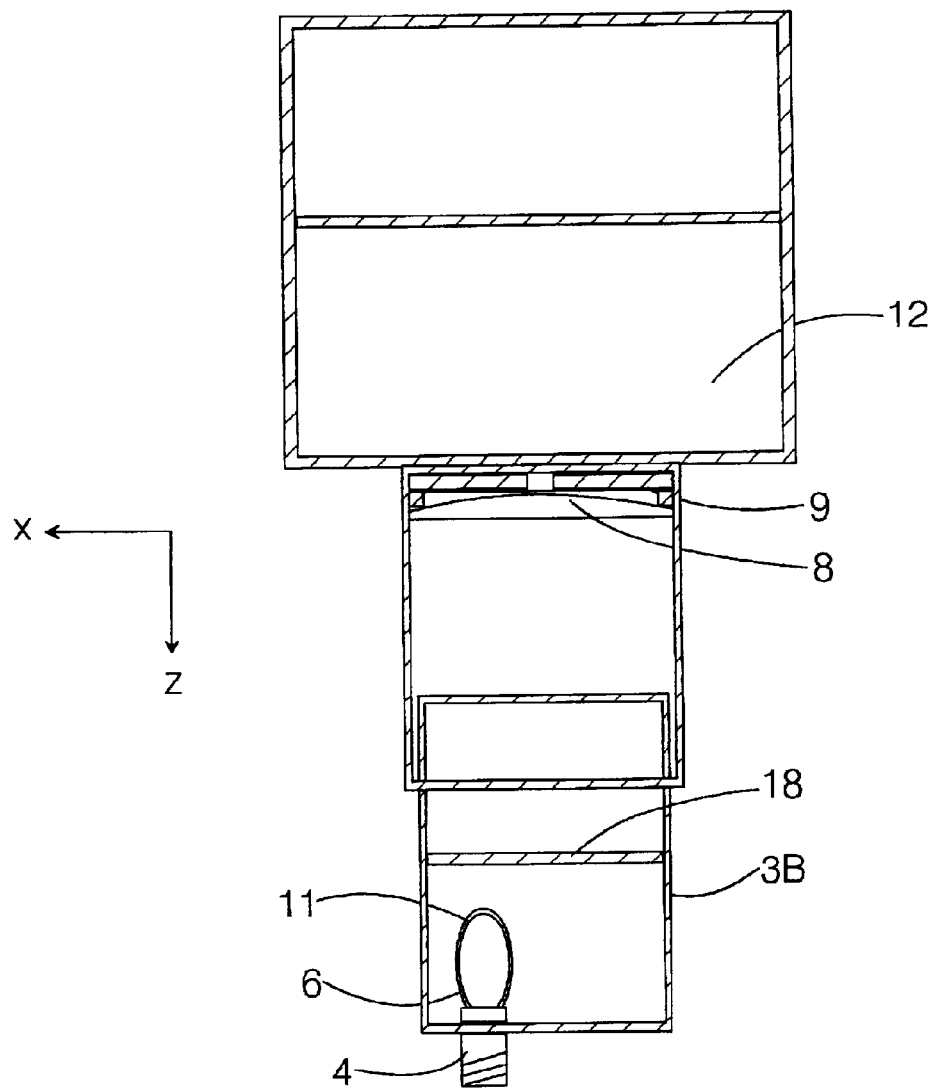
FIG. 4 is a cross-sectional view of the silhouetting apparatus according to the invention, showing the section indicated as IV—IV in FIG. 3.

Referring now to FIG. 3, it can be seen that, in the Preferred Embodiment, the adjustable mount 3 is attached to the bottom of the reflection box 1 and includes an upper section 3A and a lower section 38. As shown in FIG. 4, the lower section 3B contains a light source 11 and a connector 4, a translucent cover 18, a condensing lens . 8 for collimating light coming from the light source 11, and an aperture 9. In the Preferred Embodiment, the light source 11 is a strobe light. The translucent cover 18 is included in the mount 3 to diffuse the light from the light source, and the connector 4 is for connecting the light source 11 to a power source. Through the coupling of upper section 3A to the bottom of the reflection box 1, the entire mount 3 can be moved horizontally with respect to the bottom plane of the reflection box 1, that is, the mount 3 is adjustable along the X and Y-axes with respect to the reflection box 1. Furthermore, lower section 3B can be moved up and down with respect to the reflection box 1, that is the lower section 3B is telescopingly adjustable within the first section 3A along a Z-axis. In such manner is the light source 11 adjustable in all three dimensions with respect to the partially silvered plate 12, which in turn means that the virtual light source is also adjustable in all three directions with respect to the camera 16 and other important components of the set-up. In the Preferred Embodiment, the X-axis/Y-axis adjustability is provided by attaching the upper section 3A to a frame that slides in tracks in the bottom of the reflection box tin the X direction and in the Y direction. The Z-axis adjustability is provided by a threaded fastener 7A that can be tightened in position in a slot 7.

The adjustability along the X- and Y-axis is in general required so as to allow the light source 11 to be adjusted to make the virtual light source coaxially symmetrical with the lens of the camera 16, that is so that the principal axis of the camera 16 lies along the center of the light beam advancing from the virtual light source toward the object. Similarly, the adjustability of the light source 11 along the Z-axis allows the diameter of the virtual light source to be made coincident with, or smaller than, the diameter of the iris of the specific lens being used in the camera 16.

Figure 5:
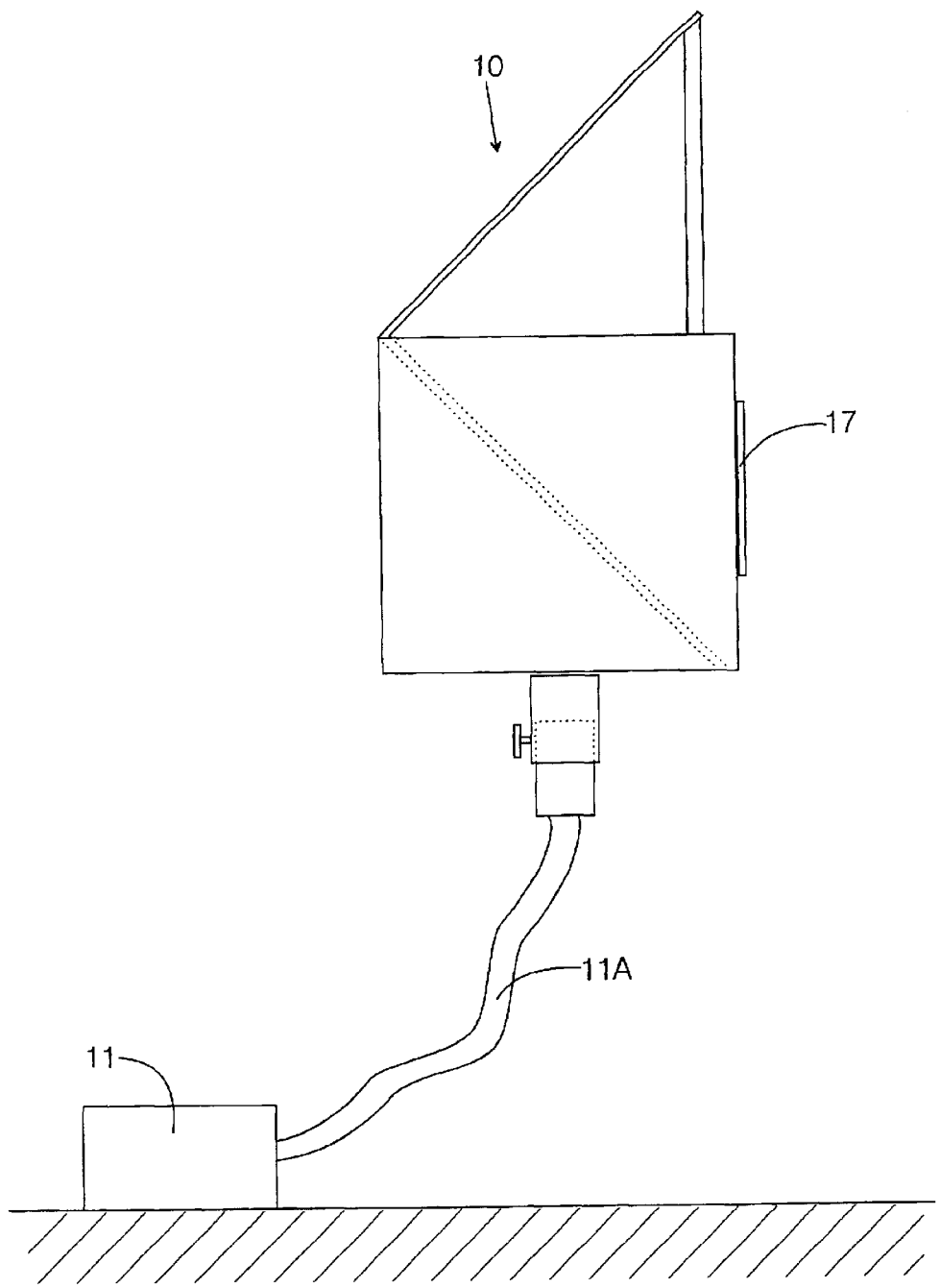
FIG. 5 shows an alternate embodiment of the silhouetting apparatus, such that the actual light source is external to the silhouetting apparatus and connected to the silhouetting apparatus by a fiber optics cable.

FIG. 5 illustrates a slight variation on the Preferred Embodiment, one where the light source 11 is separate from the silhouetting device 10 and the light is conducted to the silhouetting device 10 by means of a fiber optics cable 11A. Although in the Preferred Embodiment, the light source 11 is a strobe light, it can also be a constant light, a white light, or a colored light. If a colored light is used to take the mask exposure, a filter is also used that allows that light to pass and filters out other light.

Referring back to FIG. 1, which shows the entire set-up of the Preferred Embodiment method of the invention, it can be seen that the method includes using the silhouetting apparatus 10, the sweep 14 presenting a background surface made up of glass spheres evenly distributed on a sheet, and the support surface 15 having a clear glass surface 18. As can been seen, the sweep 14 drops vertically behind the object 13 and sweeps in slightly under the support surface 15. Dashed lines in FIG. 1 represent the light rays 20 that came originally from the light source 11, after being reflected at the partially silvered plate 12 so that they appear to come from the direction of the lens of the camera 16. Note in particular the representation by the angles $\alpha_1$–$\alpha_n$ illustrating the respective angles of incidence of the rays 20 on the sweep 14. The particular layout of the sweep 14 in the Preferred Embodiment method is chosen to ensure that angle of incidence (as the angle of incidence is defined in FIG. 1) of the rays 20 is always greater than 30°, so as to obtain the desired retro-reflection needed throughout the background. Because the rays 20 all hit the sweep 14 at angles of incidence well above 30°, virtually all the light is reflected back toward the lens of the camera 16 ensuring that the background in the masking shot is intensely bright, so that a stark contrast exists between the object 13 and the background made up of the sweep 14. Since it is highly desirable that only light from the object 13 and the sweep 14 enter the lens of the camera 16 during the taking of the mask shot (and other times as well), the inner surfaces of the reflection box 1 and any others that might reflect unwanted light toward the camera 16 are painted a flat black color. In addition, as set out above, the light trap 2 is designed with a nappy fabric surface so as to be extremely non-reflecting. This is important because of the intensity of the light striking light trap 2 during the masking shot.

As can be seen, the present invention and the Preferred Embodiment method and apparatus of the present invention does not dictate how many exposures one makes of the scene prior to the mask shot. Furthermore, nothing in the present invention precludes the use of the traditional image-manipulation techniques well-known in the field of commercial photography. In all cases, one or more color exposures will be taken of the object 13 and background sweep 14. A separate exposure is taken of the object 13 through the silhouetting device 10 to create a digital "mask." The contrast in this mask exposure can be edited on a computer screen, using a digital photography processing program that is known in the field, to increase the contrast. The mask is then overlayed over one or more or a combination of color exposures and the background, which is defined by brightness, not by color, is stripped from the image to create the desired silhouetted image.

While a Preferred Embodiment and a second embodiment are disclosed herein, it should be understood that the descriptions of the embodiments of the apparatus and the method are merely illustrative of the scope of the present invention and are not to be limiting. It is to be further understood that numerous changes may be made without straying from the scope of the present invention.

What is claimed is:

1. A device for use with a camera for creating a digital mask of a scene for discriminating between an object and a background, said camera having a lens with an iris and a principal axis, said iris having an iris diameter, said device comprising:
    a reflection box;
    a light trap;
    a beam-splitter mounted in said reflection box;
    a light source for projecting a light beam onto said beam-splitter;
    a light-source aperture deployed between said light source and said beam-splitter;
    an adjustable mount for adjusting a position of said light source relative to said beam-splitter in any of three mutually perpendicular directions;
    wherein sold reflection box has a front face and a rear face, said front face having a front upper edge and said near face having a rear upper edge and a rear lower edge, wherein said beam-splitter is planar and is mounted in said reflection box so as to extend substantially between said front upper edge and said rear lower edge,
    wherein said light trap is a substantially planar, rigid element, having a front trap edge, a rear trap edge, and two trap side edges, wherein said front trap edge is affixed to said front upper edge, and said rear trap edge is raised above said rear upper edge; and
    wherein said camera is mountable on said reflection box such that said principal axis passes through said beam-splitter, with said light beam from said light source incident on said beam-splitter at an angle of 90° to said principal axis.

2. The device described in claim 1, wherein said reflection box has a mounting ring on said rear face, said mounting ring being adaptable to said lens for mounting said camera to said reflection box.

3. The device described in claim 1, wherein said light source is provided by a fiber optics cable that is connected to an external light generator.

4. The device described in claim 3 also containing an internal light generator energizable through an electric cable connected to said device.

5. The device described in claim 3, wherein said light source is a strobe light triggerable in synchrony with a shutter release on said camera.

6. The device described in claim 1, wherein said mutually perpendicular directions are along an X-axis, a Y-axis, and a Z-axis, respectively, said Z-axis being parallel to said direction of said light beam and said X-axis being parallel to said principal axis.

7. The device described in claim 6, wherein said light source is positionable by said adjustment means along said X-axis and/or said Y-axis to align said virtual light source coaxially with said iris.

8. The device described in claim 6, wherein said light source is positionable by said adjustment means along said Z-axis to effect a virtual diameter of said virtual light source that is no greater than said iris diameter.

9. Apparatus for creating a digital mask of an object for discriminating, in a digital photograph, between said object and a background of said object, said apparatus comprising:
    a digital camera;
    a device according to claim 1;
    a support for said object; and
    a sweep;
    wherein said apparatus is mounted on said camera, wherein said support for said object is a substantially horizontal, transparent surface and said objects placed on said surface, wherein said sweep is arranged substantially vertically behind said object and extends below said horizontal glass surface of said support.

10. The apparatus of claim 9, wherein said sweep is a retro-reflective sheet covered with transparent spheres.

11. The apparatus of claim 10, wherein said spheres are glass spheres.

12. A method for producing a photograph of an object where said photograph contains only the object, said method comprising the steps of:

a. providing a retro-reflective sweep behind said object;
b. supporting said object on a transparent surface;
c. taking a mask exposure, wherein said object and said sweep are illuminated by a light source during said mask exposure so that a sharp brightness contrast is obtained between said object and said sweep;
d. using said sharp brightness contrast to define a background mask that is independent of color;
e. using said background mask to strip said background from said photograph, based on said brightness contrast and not on color.

13. The method according to claim 12, wherein said light source is a strobe light synchronized with a shutter release mechanism of said camera.

14. The method according to claim 12, wherein said light source is constantly energized.

15. The method according to claim 12, wherein said light source generates light of a particular color.

16. The device of claim 1, further comprising a translucent cover placed between said light source aperture and said light source.

* * * * *

UNITED STATES PATENT AND TRADEMARK OFFICE
CERTIFICATE OF CORRECTION

PATENT NO. : 6,885,767 B1
DATED : April 26, 2005
INVENTOR(S) : Paul Howell

It is certified that error appears in the above-identified patent and that said Letters Patent is hereby corrected as shown below:

Column 2,
Line 11, replace "5,948,500" with -- 5,946,500 --.
Line 19, replace "8,134,348" with -- 6,134,346 --.

Column 5,
Line 30, replace "splinter" with -- splitter --.

Column 7,
Line 36, replace "94 degrees" with -- 90 degrees --.

Column 8,
Line 17, replace "38" with -- 3B --.
Line 41, replace "tin" with -- 1 in --.

Column 10,
Line 4, replace "sold" with -- said --.

Signed and Sealed this

Sixteenth Day of August, 2005

JON W. DUDAS
*Director of the United States Patent and Trademark Office*